V. CUTTITTA.
TIRE FILLER.
APPLICATION FILED MAR. 2, 1920.
1,369,626. Patented Feb. 22, 1921.
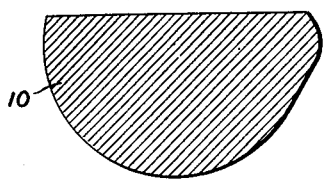
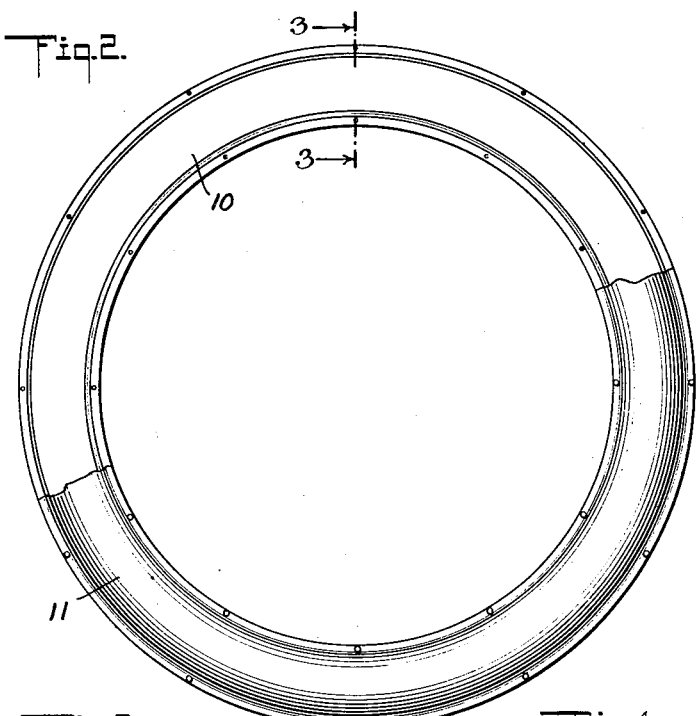
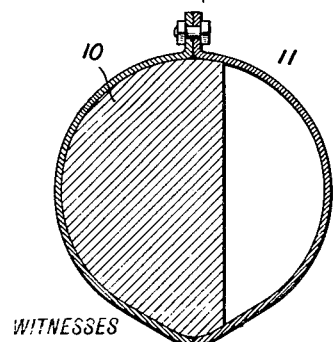
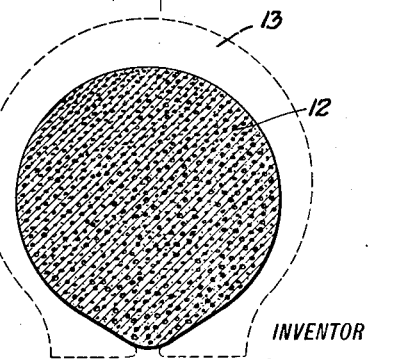
WITNESSES
INVENTOR
VINCENT CUTTITTA
BY
ATTORNEYS

UNITED STATES PATENT OFFICE.

VINCENT CUTTITTA, OF NEW YORK, N. Y.

TIRE-FILLER.

1,369,626.                    Specification of Letters Patent.    Patented Feb. 22, 1921.

Application filed March 2, 1920. Serial No. 362,802.

*To all whom it may concern:*

Be it known that I, VINCENT CUTTITTA, a citizen of the United States, and a resident of the city of New York, borough of Manhattan, in the county and State of New York, have invented a new and Improved Tire-Filler, of which the following is a full, clear, and exact description.

The invention relates to cushion tires for wheels of automobiles, auto-trucks, motor cycles, bicycles and other similar vehicles, aeroplanes and other craft.

The object of the invention is to provide a new and improved tire filler adapted to fit into the shoe of a tire in lieu of an inner inflated tube and arranged to provide the desired cushioning effect.

Another object is to permit of varying the proportions of the ingredients forming the composition to correspond to the load of the vehicle or air craft on which the wheels are used, that is, to the pounds pressure per square inch of proper air inflation for a correspondingly sized inner tube.

The composition consists essentially of the following ingredients in about the proportions stated, namely,

| | |
|---|---|
| Crude rubber | 45% to 70% |
| Compounding ingredient or filler | 10% to 45% |
| Vulcanizing ingredient | 3% to 20% |
| Accelerator | ½% to 30% |
| Leavener | ½% to 4% |
| Vehicle | ½% to 3% |

As the filler or compounding ingredient whiting is preferred, but other suitable materials may be used, namely, vermilion, barium, red lead, sublimed lead, lithopone, zinc oxid, yellow ocher, barytes, aluminum flake, graphite, powdered mica, infusorial earth and soapstone. As a vulcanizing ingredient use is made of sulfur, and 3% to 4% sulfur is appropriate, but when a 20% vulcanizing ingredient is needed then antimony, or a combination of sulfur and antimony, or a combination of sulfur and (sulfureted lead) is used. As an accelerator, litharge is preferably used, but a half of one per cent. in a mixture as an accelerator would not be sufficient. An amount of accelerene in that proportion is appropriate. For a leavener, ammonium carbonate is preferably employed, but bicarbonate, sal soda, alum, aluminum sulfate or baking powder may be used. Coal tar is used as a vehicle although heavy oils such as rosin oil, boiled linseed oil, pine tar, pine oil, palm oil, wax or the like may be used.

The above mentioned ingredients forming the composition are worked together in a suitable rubber mill until the ingredients are thoroughly mixed together. This mixture is next formed into stock 10 (see Figure 1) by a tubing machine, such, for instance, as is used for making rubber hose or tubing, or solid rubber tires for wagons and automobiles. This stock 10 is of a cross section corresponding to about two-thirds of the cross section of the finished filler and is made either in complete ring shape or in segmental sections and of a diameter according to the size of the shoe in which the filler is to be used. The stock 10, which is a homogeneous mass, is next placed into a ring-shaped mold 11, preferably formed of two sections having outwardly extending flanges bolted together, as plainly shown in Figs. 2 and 3. The inside of the mold corresponds to the inside of the shoe in which the filler is to be used, and when the stock 10 is placed in position in the mold it fills two-thirds thereof, as will be understood by reference to Fig. 3.

The mold 11 with the stock 10 therein is next placed in a vulcanizer and vulcanized at a steam pressure of 50 to 60 lbs. for a period of 1 h. 40 m. to 2½ hours, according to the thickness or diameter of the stock that is being vulcanized. By this vulcanizing process the air in the mold 11 is absorbed by the stock, thus forming the filler 12. The absorbed air is uniformly distributed in the entire mass in the form of minute air pockets, as indicated in Fig. 4, thus giving the desired porosity to the filler, at the same time providing the filler with an ample rebounding quality corresponding to that of a properly inflated inner tube of the same size.

It is understood that the proportions of the several ingredients are varied according to the particular use made of the tire: Thus, for instance, for a 3½-inch tire for an automobile, the following ingredients in about the proportions stated have been found to be best suited:

| | |
|---|---|
| Para rubber | 56 lbs. |
| Whiting | 27 lbs. |
| Litharge | 13 lbs. |
| Sulfur | 3 lbs. |
| Ammoniac carbonate | 1¼ lbs. |
| Coal tar | 1¼ lbs. |
| Making a total of | 101½ lbs. |

This amount is ample for making about seven tires, 3½ inches thick, or nine tires, 3 inches thick.

For a 3-inch tire the same ingredients are used with the proportions of whiting and litharge reversed, that is, using 13 lbs. of whiting and 27 lbs. of litharge.

Having thus described my invention, I claim as new and desire to secure by Letters Patent:—

1. A composition of matter to be used as a tire filler consisting of the following ingredients in about the proportions stated, namely:

| | |
|---|---|
| Crude rubber | 45% to 70% |
| Compounding ingredient or filler | 10% to 45% |
| Vulcanizing ingredient | 3% to 20% |
| Accelerator | ½% to 30% |
| Leavener | ½% to 4% |
| Vehicle | ½% to 3% |

2. As an article of manufacture, a tire filler comprising a mixture formed of the following ingredients in about the proportions specified, namely: crude rubber, a compounding ingredient or filler, a vulcanizing ingredient, an accelerator, a leavener, and a vehicle, the mixture having minute air pockets distributed throughout the mixture thereby providing the mixture with a rebounding quality.

VINCENT CUTTITTA.